US011361075B1

(12) United States Patent
Singh

(10) Patent No.: US 11,361,075 B1
(45) Date of Patent: Jun. 14, 2022

(54) IMAGE STEGANOGRAPHY DETECTION

(71) Applicant: Citrix Systems, Inc., Fort Lauderdale, FL (US)

(72) Inventor: Manbinder Pal Singh, Coral Springs, FL (US)

(73) Assignee: Citrix Systems, inc., Ft. Lauderdale, FL (US)

( * ) Notice: Subject to any disclaimer, the term of this patent is extended or adjusted under 35 U.S.C. 154(b) by 0 days.

(21) Appl. No.: 17/351,441

(22) Filed: Jun. 18, 2021

(51) Int. Cl.
*G06F 21/56* (2013.01)
*G06T 7/00* (2017.01)
*G06F 21/55* (2013.01)

(52) U.S. Cl.
CPC .......... *G06F 21/565* (2013.01); *G06F 21/554* (2013.01); *G06T 7/0002* (2013.01); *G06F 2221/2101* (2013.01)

(58) Field of Classification Search
None
See application file for complete search history.

(56) References Cited

U.S. PATENT DOCUMENTS

| 7,496,210 | B2* | 2/2009 | Shi | G06T 1/0028 |
| | | | | 382/100 |
| 8,151,117 | B2* | 4/2012 | Hicks | G06F 21/564 |
| | | | | 713/187 |
| 8,234,496 | B1* | 7/2012 | Ding | G06F 21/16 |
| | | | | 713/176 |
| 8,650,609 | B2* | 2/2014 | Kasahara | G06F 21/64 |
| | | | | 726/1 |
| 8,726,396 | B1* | 5/2014 | Dodke | G06F 21/6209 |
| | | | | 726/26 |
| 10,810,725 | B1* | 10/2020 | Dolhansky | G06T 1/0028 |
| 2004/0047513 | A1* | 3/2004 | Kondo | G06T 7/44 |
| | | | | 382/254 |
| 2010/0091981 | A1* | 4/2010 | Shi | G06T 1/0028 |
| | | | | 380/28 |
| 2010/0329576 | A1* | 12/2010 | Tian | G06K 9/00 |
| | | | | 382/218 |
| 2015/0026464 | A1* | 1/2015 | Hanner, Sr. | G06F 21/6209 |
| | | | | 713/168 |
| 2016/0043915 | A1* | 2/2016 | Hanner, Sr. | H04L 63/123 |
| | | | | 709/224 |
| 2016/0269589 | A1* | 9/2016 | Sargent | H04N 1/32267 |

(Continued)

OTHER PUBLICATIONS

Akinola et al., On the Image Quality and Encoding Times of LSB, MSB and Combined LSB-MSB Steganography Algorithms Using Digital Images, International Journal of Computer Science & Information Technology (IJCSIT) vol. 7, No. 4, Aug. 2015 (Year: 2015).*

*Primary Examiner* — Christopher C Harris
(74) *Attorney, Agent, or Firm* — Daly, Crowley, Mofford & Durkee, LLP

(57) ABSTRACT

In one aspect, an illustrative methodology implementing the disclosed techniques includes, by a computing device, determining that an application process includes use of a first image and a second image, one of the first and second images being generated as part of the application process, and detecting a difference in content of the first image or the second image based on a comparison of the first and second images. The method also includes, by the computing device, revoking access to a file that includes at least one of the first and second images based on the detection of the difference in content of one of the first and second images.

13 Claims, 11 Drawing Sheets

(56) References Cited

U.S. PATENT DOCUMENTS

| | | | |
|---|---|---|---|
| 2016/0283746 A1* | 9/2016 | Boshoff | H04N 1/4446 |
| 2016/0292454 A1* | 10/2016 | Manmohan | G06F 21/6281 |
| 2016/0315967 A1* | 10/2016 | Trevathan | H04W 4/80 |
| 2018/0181266 A1* | 6/2018 | von Muhlen | G06F 21/6218 |
| 2018/0351968 A1* | 12/2018 | MacLeod | G06F 21/566 |
| 2019/0182268 A1* | 6/2019 | Lancioni | H04L 63/1425 |
| 2019/0259126 A1* | 8/2019 | German | G06K 9/346 |

\* cited by examiner

IMAGE STEGANOGRAPHY DETECTION

BACKGROUND

Steganography is the practice of concealing information, such as a secret message, within ordinary digital media without changing its perceptual quality (e.g., its visible or audible quality). With steganography, the ordinary digital media within which the secret message is hidden (also known as a carrier) is perceptible, whereas the secret message is substantially imperceptible such that a person viewing/listening to the digital media is not aware of the existence of the secret message. The goal of steganography is to hide the very presence of a communication (i.e., communication of the secret message). This differs from cryptography which seeks to make a communication unintelligible by a third party who does not possess the right keys, but does not attempt to hide that a secret message is being sent.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

It is appreciated herein that, although some organizations may provide security controls for protecting sensitive content, such controls may not be effective at protecting such content from various forms of insider threats. For example, one such form of insider threat involves the use of image steganography. Image steganography refers to the technique of unobtrusively hiding information (i.e., sensitive content) within the noisy regions of an image to obtain a "stegno-image" and retrieving the hidden information from the stegno-image at the destination. For added security, the hidden information can also be encrypted, thereby increasing the perceived randomness and decreasing the likelihood of information discovery even in cases where the existence of the hidden information is detected. However, endpoint security control solutions deployed by an organization are unable to detect, with any certainty, the presence of concealed information in an image without having intimate knowledge of the specific encoding/encryption mechanism used to hide the information in the image. Moreover, such security control solutions that attempt to detect data exfiltration at egress points are rendered ineffective against a bad actor who may just copy the stegno-image to a portable data storage device, such as a USB drive, and never go via the egress points. Embodiments of the present disclosure provide solutions to these and other technical problems described herein.

In accordance with one example embodiment provided to illustrate the broader concepts, systems, and techniques described herein, a method may include, by a computing device, determining that an application process includes use of a first image and a second image, one of the first and second images being generated as part of the application process, and detecting a difference in content of the first image or the second image based on a comparison of the first and second images. The method may also include, by the computing device, revoking access to a file that includes at least one of the first and second images based on the detection of the difference in content of one of the first and second images.

According to another illustrative embodiment provided to illustrate the broader concepts described herein, a system includes a memory and one or more processors in communication with the memory. The processor may be configured to determine that an application process includes use of a first image and a second image, one of the first and second images being generated as part of the application process, and detect a difference in content of the first image or the second image based on a comparison of the first and second images. The processor may be further configured to revoke access to a file that includes at least one of the first and second images based on the detection of the difference in content of one of the first and second images.

According to another illustrative embodiment provided to illustrate the broader concepts described herein, a method may include, by a computing device, determining that an application process includes use of a plurality of images, one of the plurality being generated as part of the application process, and detecting a call to encrypt content included in a file, the call being initiated as part of the application process, and the file including one of the plurality of images. The method may also include, by the computing device, revoking access to the file based on the detected call to encrypt the file and use, by the application process, of the plurality of images.

According to another illustrative embodiment provided to illustrate the broader concepts described herein, a system includes a memory and one or more processors in communication with the memory. The processor may be configured to determine that an application process includes use of a plurality of images, one of the plurality being generated as part of the application process, and detect a call to encrypt content included in a file, the call being initiated as part of the application process, and the file including one of the plurality of images. The processor may be further configured to revoke access to the file based on the detected call to encrypt the file and use, by the application process, of the plurality of images.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
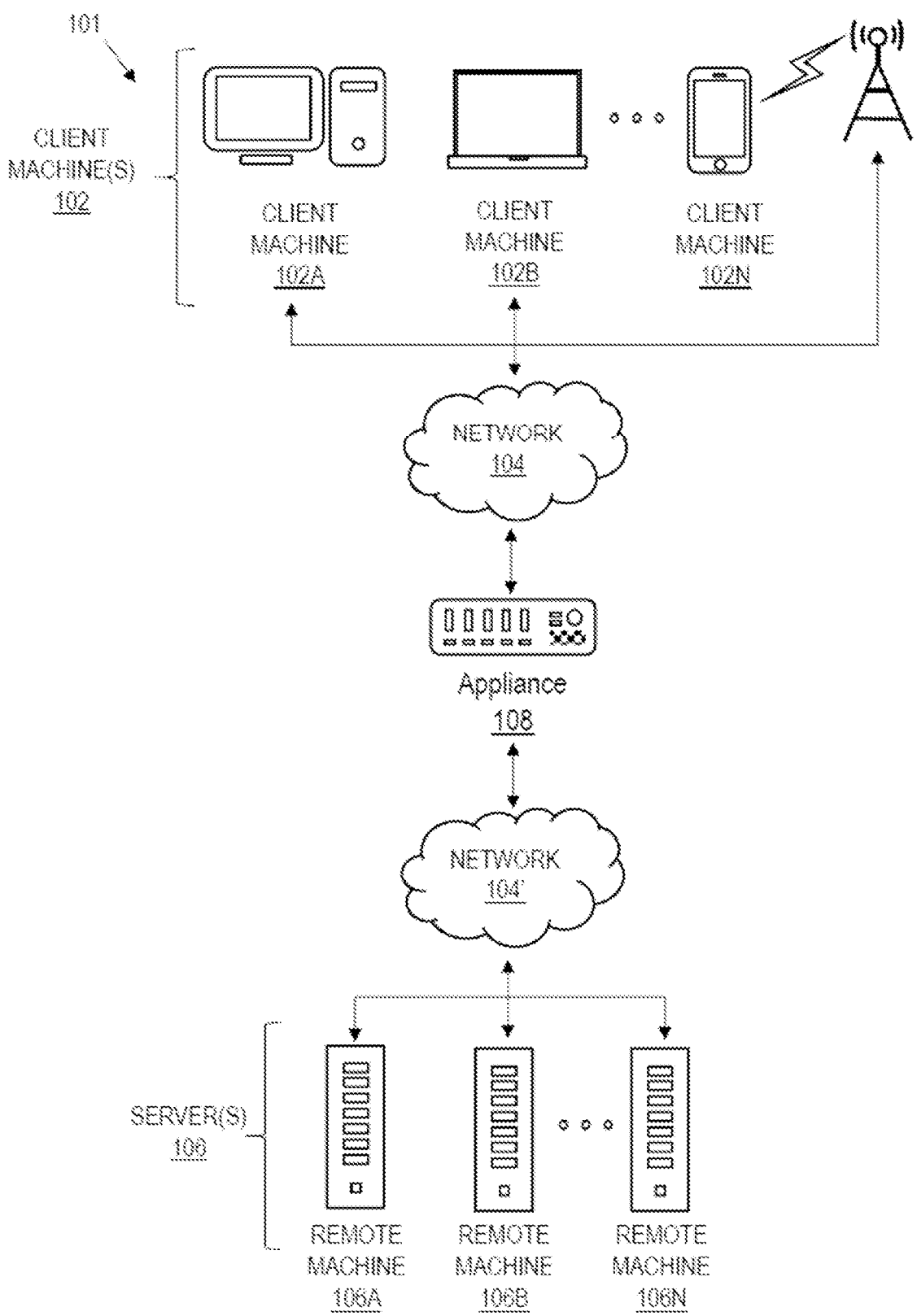
FIG. 1 is a diagram of an illustrative network computing environment in which embodiments of the present disclosure may be implemented.

Referring now to FIG. 1, shown is an illustrative network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
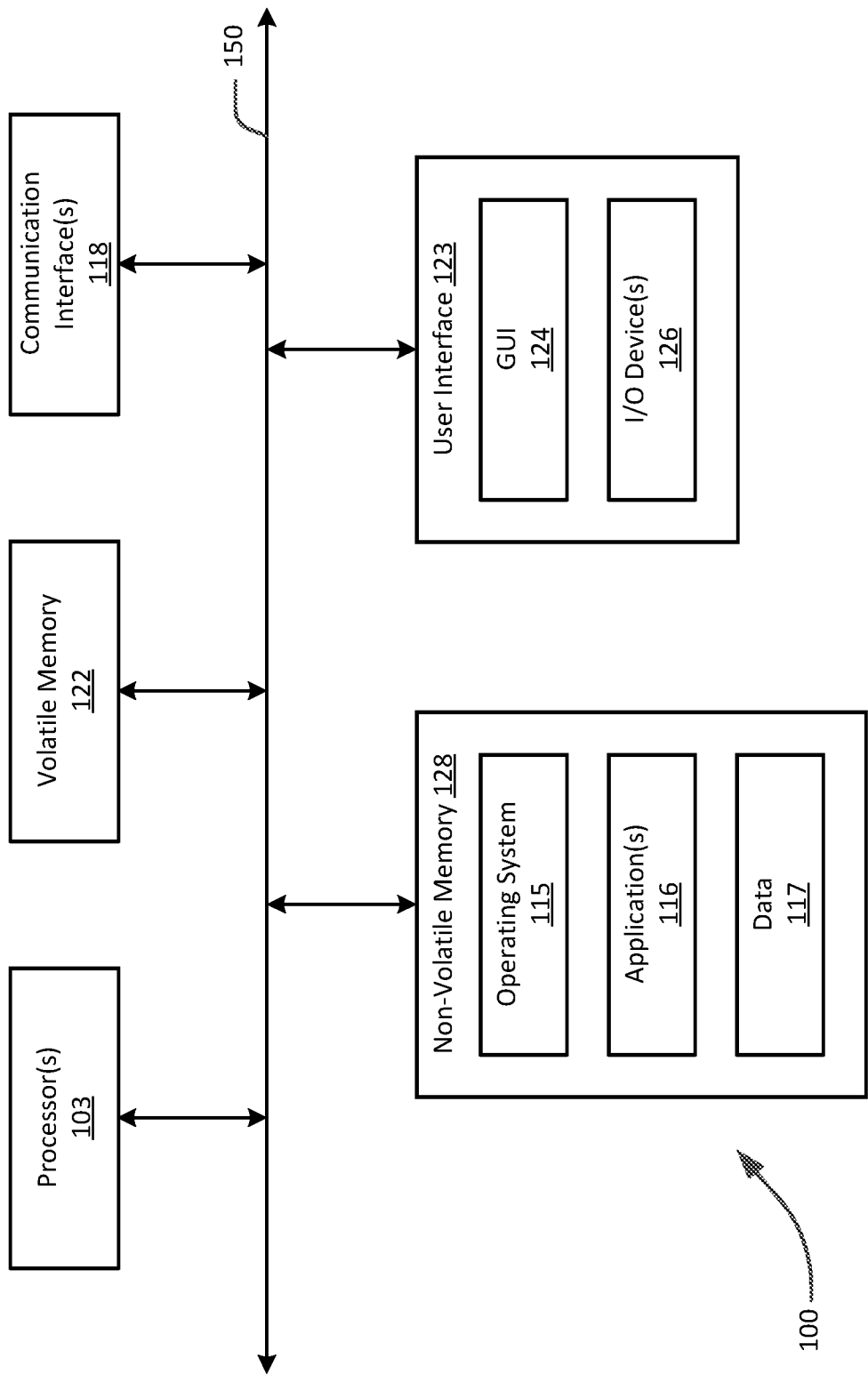
FIG. 2 is a block diagram illustrating selective components of an example computing device in which various aspects of the disclosure may be implemented, in accordance with an embodiment of the present disclosure.

FIG. 2 is a block diagram illustrating selective components of an illustrative computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an illustrative client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
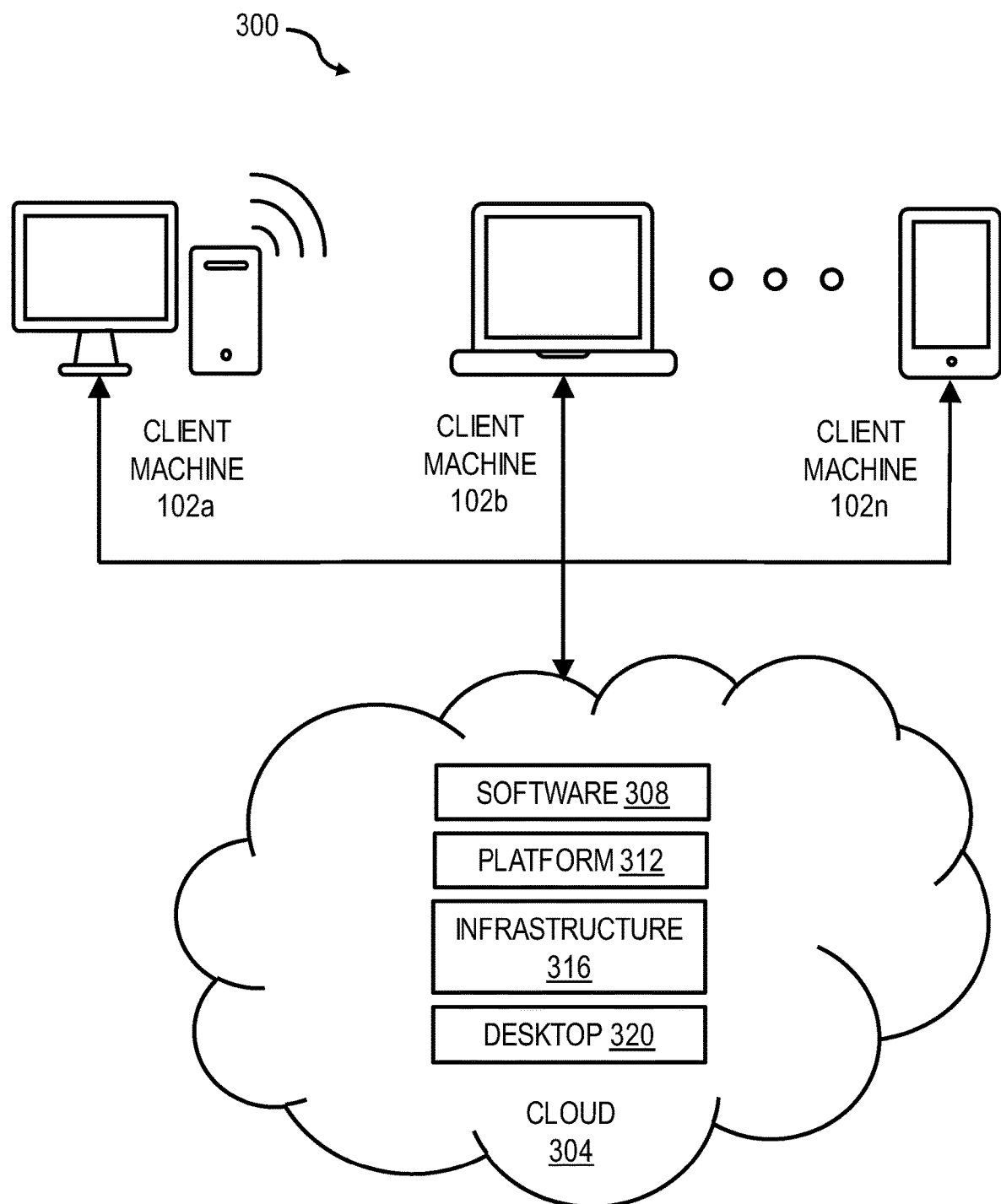
FIG. 3 is a schematic block diagram of a cloud computing environment in which various aspects of the disclosure may be implemented.

Referring to FIG. 3, a cloud computing environment 300 is depicted, which may also be referred to as a cloud environment, cloud computing or cloud network. Cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more clients 102a-102n (such as those described above) are in communication with a cloud network 304. Cloud network 304 may include back-end platforms, e.g., servers, storage, server farms or data centers. The users or clients 102a-102n can correspond to a single organization/tenant or multiple organizations/tenants. More particularly, in one illustrative implementation, cloud computing environment 300 may provide a private cloud serving a single organization (e.g., enterprise cloud). In another example, cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, cloud computing environment 300 may provide a hybrid cloud that is a combination of a public cloud and a private cloud. Public clouds may include public servers that are maintained by third parties to clients 102a-102n or the enterprise/tenant. The servers may be located off-site in remote geographical locations or otherwise.

Cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. Cloud computing environment 300 can provide an elasticity to dynamically scale out or scale in response to different demands from one or more clients 102. In some embodiments, cloud computing environment 300 can include or provide monitoring services to monitor, control and/or generate reports corresponding to the provided shared services and resources.

In some embodiments, cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g., Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
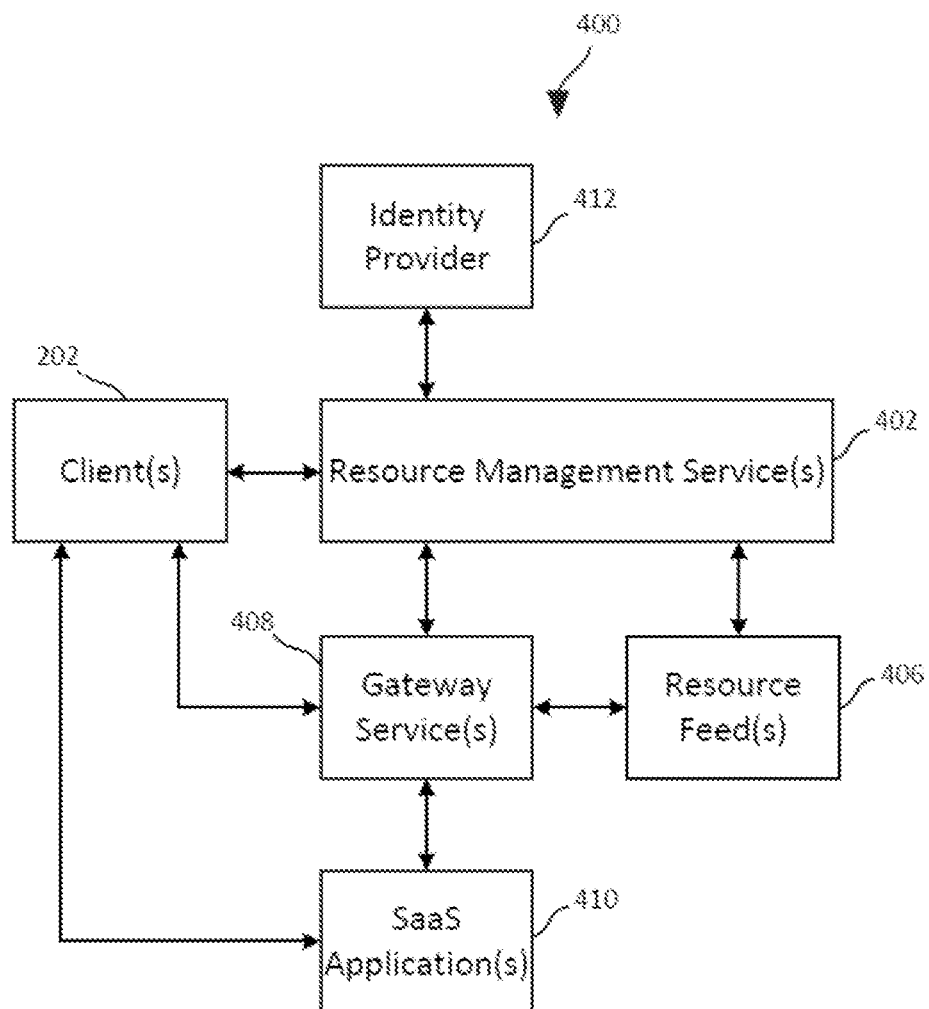
FIG. 4A is a block diagram of an illustrative system in which resource management services may manage and streamline access by clients to resource feeds (via one or more gateway services) and/or software-as-a-service (SaaS) applications.

FIG. 4A is a block diagram of an illustrative system 400 in which one or more resource management services 402 may manage and streamline access by one or more clients 202 to one or more resource feeds 406 (via one or more gateway services 408) and/or one or more software-as-a-service (SaaS) applications 410. In particular, resource management service(s) 402 may employ an identity provider 412 to authenticate the identity of a user of a client 202 and, following authentication, identify one of more resources the user is authorized to access. In response to the user selecting one of the identified resources, resource management service(s) 402 may send appropriate access credentials to the requesting client 202, and the requesting client 202 may then use those credentials to access the selected resource. For resource feed(s) 406, client 202 may use the supplied credentials to access the selected resource via gateway service 408. For SaaS application(s) 410, client 202 may use the credentials to access the selected application directly.

Client(s) 202 may be any type of computing devices capable of accessing resource feed(s) 406 and/or SaaS application(s) 410, and may, for example, include a variety of desktop or laptop computers, smartphones, tablets, etc. Resource feed(s) 406 may include any of numerous resource types and may be provided from any of numerous locations. In some embodiments, for example, resource feed(s) 406 may include one or more systems or services for providing virtual applications and/or desktops to client(s) 202, one or more file repositories and/or file sharing systems, one or more secure browser services, one or more access control services for SaaS applications 410, one or more management services for local applications on client(s) 202, one or more internet enabled devices or sensors, etc. Each of resource management service(s) 402, resource feed(s) 406, gateway service(s) 408, SaaS application(s) 410, and identity provider 412 may be located within an on-premises data center of an organization for which system 400 is deployed, within one or more cloud computing environments, or elsewhere.

Figure 4B:
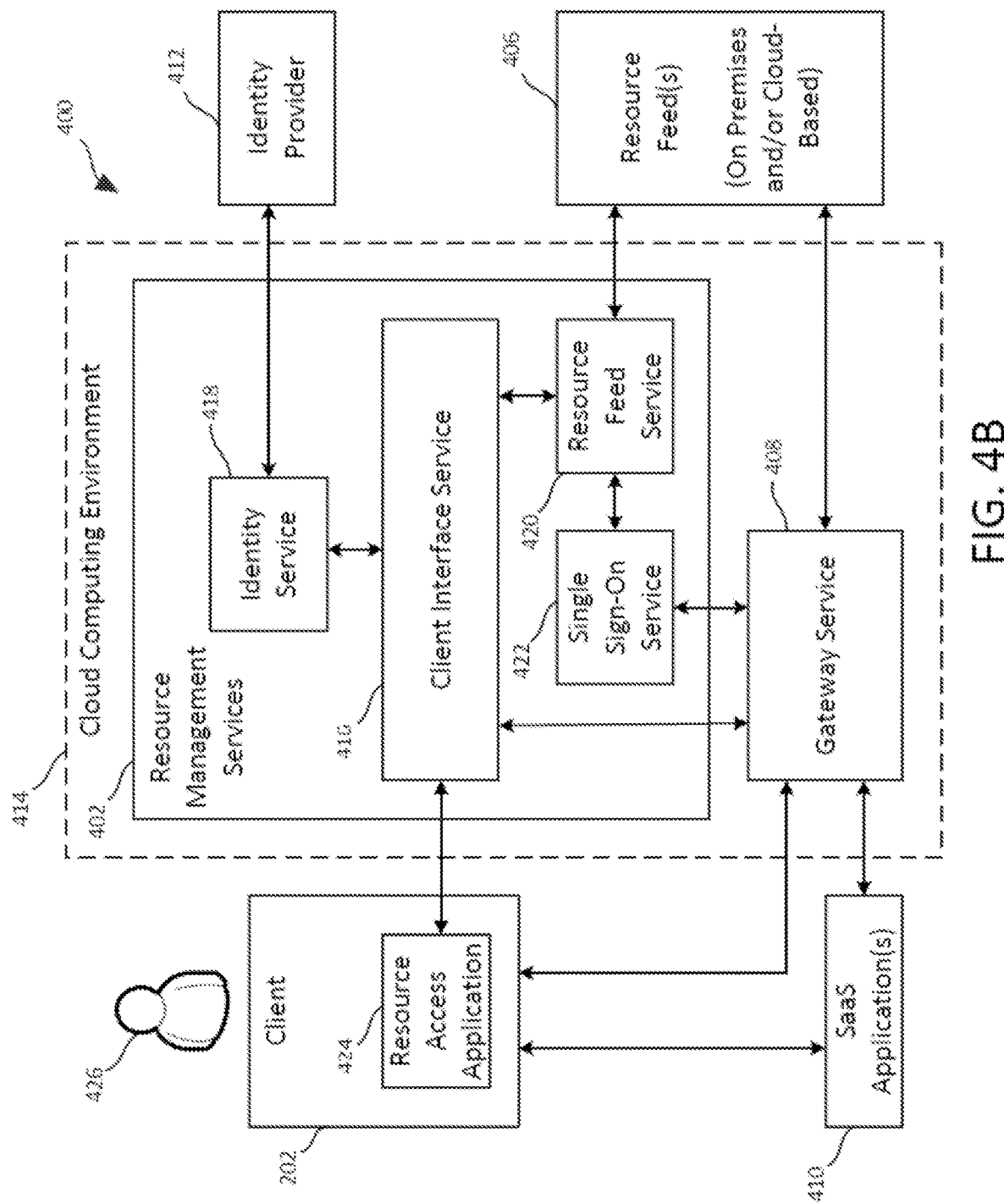
FIG. 4B is a block diagram showing an illustrative implementation of the system shown in FIG. 4A in which various resource management services as well as a gateway service are located within a cloud computing environment.

FIG. 4B is a block diagram showing an illustrative implementation of system 400 shown in FIG. 4A in which various resource management services 402 as well as gateway service 408 are located within a cloud computing environment 414. The cloud computing environment may, for example, include Microsoft Azure Cloud, Amazon Web Services, Google Cloud, or IBM Cloud.

For any of illustrated components (other than client 202) that are not based within cloud computing environment 414, cloud connectors (not shown in FIG. 4B) may be used to interface those components with cloud computing environment 414. Such cloud connectors may, for example, run on Windows Server instances hosted in resource locations and may create a reverse proxy to route traffic between the site(s) and cloud computing environment 414. In the illustrated example, the cloud-based resource management services 402 include a client interface service 416, an identity service 418, a resource feed service 420, and a single sign-on service 422. As shown, in some embodiments, client 202 may use a resource access application 424 to communicate with client interface service 416 as well as to present a user interface on client 202 that a user 426 can operate to access resource feed(s) 406 and/or SaaS application(s) 410. Resource access application 424 may either be installed on client 202 or may be executed by client interface service 416 (or elsewhere in system 400) and accessed using a web browser (not shown in FIG. 4B) on client 202.

As explained in more detail below, in some embodiments, resource access application 424 and associated components may provide user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When resource access application 424 is launched or otherwise accessed by user 426, client interface service 416 may send a sign-on request to identity service 418. In some embodiments, identity provider 412 may be located on the premises of the organization for which system 400 is deployed. Identity provider 412 may, for example, correspond to an on-premises Windows Active Directory. In such embodiments, identity provider 412 may be connected to the cloud-based identity service 418 using a cloud connector (not shown in FIG. 4B), as described above. Upon receiving a sign-on request, identity service 418 may cause resource access application 424 (via client interface service 416) to prompt user 426 for the user's authentication credentials (e.g., username and password). Upon receiving the user's authentication credentials, client interface service 416 may pass the credentials along to identity service 418, and identity service 418 may, in turn, forward them to identity provider 412 for authentication, for example, by comparing them against an Active Directory domain. Once identity service 418 receives confirmation from identity provider 412 that the user's identity has been properly authenticated, client interface service 416 may send a request to resource feed service 420 for a list of subscribed resources for user 426.

In other embodiments (not illustrated in FIG. 4B), identity provider 412 may be a cloud-based identity service, such as a Microsoft Azure Active Directory. In such embodiments, upon receiving a sign-on request from client interface service 416, identity service 418 may, via client interface service 416, cause client 202 to be redirected to the cloud-based identity service to complete an authentication process. The cloud-based identity service may then cause client 202 to prompt user 426 to enter the user's authentication credentials. Upon determining the user's identity has been properly authenticated, the cloud-based identity service may send a message to resource access application 424 indicating the authentication attempt was successful, and resource access application 424 may then inform client interface service 416 of the successfully authentication. Once identity service 418 receives confirmation from client interface service 416 that the user's identity has been properly authenticated, client interface service 416 may send a request to resource feed service 420 for a list of subscribed resources for user 426.

For each configured resource feed, resource feed service 420 may request an identity token from single sign-on service 422. Resource feed service 420 may then pass the feed-specific identity tokens it receives to the points of authentication for the respective resource feeds 406. Each resource feed 406 may then respond with a list of resources configured for the respective identity. Resource feed service 420 may then aggregate all items from the different feeds and forward them to client interface service 416, which may cause resource access application 424 to present a list of available resources on a user interface of client 202. The list of available resources may, for example, be presented on the user interface of client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®), one or more secure browsers, one or more internet enabled devices or sensors, one or more local applications installed on client 202, and/or one or more SaaS applications 410 to which user 426 has subscribed. The lists of local applications and SaaS applications 410 may, for example, be supplied by resource feeds 406 for respective services that manage which such applications are to be made available to user 426 via resource access application 424. Examples of SaaS applications 410 that may be managed and accessed as described herein include Microsoft Office 365 applications, SAP SaaS applications, Workday applications, etc.

For resources other than local applications and SaaS application(s) 410, upon user 426 selecting one of the listed available resources, resource access application 424 may cause client interface service 416 to forward a request for the specified resource to resource feed service 420. In response to receiving such a request, resource feed service 420 may request an identity token for the corresponding feed from single sign-on service 422. Resource feed service 420 may then pass the identity token received from single sign-on service 422 to client interface service 416 where a launch ticket for the resource may be generated and sent to resource access application 424. Upon receiving the launch ticket, resource access application 424 may initiate a secure session to gateway service 408 and present the launch ticket. When gateway service 408 is presented with the launch ticket, it may initiate a secure session to the appropriate resource feed and present the identity token to that feed to seamlessly authenticate user 426. Once the session initializes, client 202 may proceed to access the selected resource.

When user 426 selects a local application, resource access application 424 may cause the selected local application to launch on client 202. When user 426 selects SaaS application 410, resource access application 424 may cause client interface service 416 request a one-time uniform resource locator (URL) from gateway service 408 as well a preferred browser for use in accessing SaaS application 410. After gateway service 408 returns the one-time URL and identifies the preferred browser, client interface service 416 may pass that information along to resource access application 424. Client 202 may then launch the identified browser and initiate a connection to gateway service 408. Gateway service 408 may then request an assertion from single sign-on service 422. Upon receiving the assertion, gateway service 408 may cause the identified browser on client 202 to be redirected to the logon page for identified SaaS application 410 and present the assertion. The SaaS may then contact gateway service 408 to validate the assertion and authenticate user 426. Once the user has been authenticated, communication may occur directly between the identified browser and the selected SaaS application 410, thus allowing user 426 to use client 202 to access the selected SaaS application 410.

In some embodiments, the preferred browser identified by gateway service 408 may be a specialized browser embedded in resource access application 424 (when the resource application is installed on client 202) or provided by one of the resource feeds 406 (when resource access application 424 is located remotely), e.g., via a secure browser service. In such embodiments, SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have client interface service 416 send the link to a secure browser service, which may start a new virtual browser session with client 202, and thus allow the user to access the potentially harmful linked content in a safe environment.

In some embodiments, in addition to or in lieu of providing user 426 with a list of resources that are available to be accessed individually, as described above, user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify user 426 of something that requires the user's attention (e.g., approval of an expense report, new course available for registration, etc.).

Figure 4C:
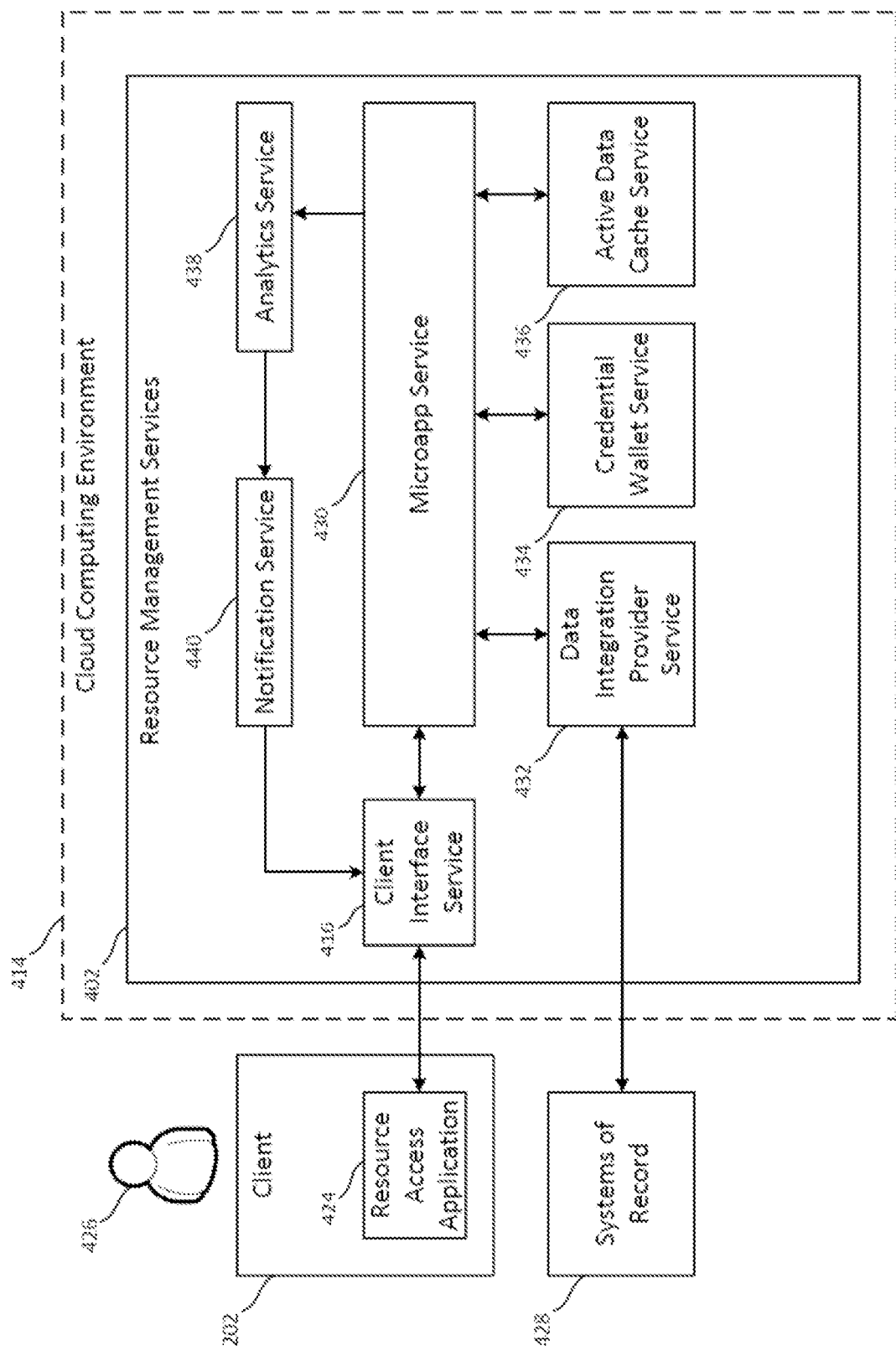
FIG. 4C is a block diagram similar to FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for client 202. In the example shown, in addition to client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within resource access application 424 without having to launch the native application. The system shown in FIG. 4C may, for example, aggregate relevant notifications, tasks, and insights, and thereby give user 426 a dynamic productivity tool. In some embodiments, the resource activity feed may be intelligently populated by utilizing machine learning and artificial intelligence (AI) algorithms. Further, in some implementations, microapps may be configured within cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, systems of record 428 may represent the applications and/or other resources resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. Resource management services 402, and in particular data integration provider service 432, may, for example, support REST API, JSON, OData-JSON, and 6ML. As explained in more detail below, data integration provider service 432 may also write back to the systems of record, for example, using OAuth2 or a service account.

In some embodiments, microapp service 430 may be a single-tenant service responsible for creating the microapps. Microapp service 430 may send raw events, pulled from systems of record 428, to analytics service 438 for processing. The microapp service may, for example, periodically pull active data from systems of record 428.

In some embodiments, active data cache service 436 may be single-tenant and may store all configuration information and microapp data. It may, for example, utilize a per-tenant database encryption key and per-tenant database credentials.

In some embodiments, credential wallet service 434 may store encrypted service credentials for systems of record 428 and user OAuth2 tokens.

In some embodiments, data integration provider service 432 may interact with systems of record 428 to decrypt end-user credentials and write back actions to systems of record 428 under the identity of the end-user. The write-back actions may, for example, utilize a user's actual account to ensure all actions performed are compliant with data policies of the application or other resource being interacted with.

In some embodiments, analytics service 438 may process the raw events received from microapps service 430 to create targeted scored notifications and send such notifications to notification service 440.

Finally, in some embodiments, notification service 440 may process any notifications it receives from analytics service 438. In some implementations, notification service 440 may store the notifications in a database to be later served in a notification feed. In other embodiments, notification service 440 may additionally or alternatively send the notifications out immediately to client 202 as a push notification to user 426.

In some embodiments, a process for synchronizing with systems of record 428 and generating notifications may operate as follows. Microapp service 430 may retrieve encrypted service account credentials for systems of record 428 from credential wallet service 434 and request a sync with data integration provider service 432. Data integration provider service 432 may then decrypt the service account credentials and use those credentials to retrieve data from systems of record 428. Data integration provider service 432 may then stream the retrieved data to microapp service 430. Microapp service 430 may store the received systems of record data in active data cache service 436 and also send raw events to analytics service 438. Analytics service 438 may create targeted scored notifications and send such notifications to notification service 440. Notification service 440 may store the notifications in a database to be later served in a notification feed and/or may send the notifications out immediately to client 202 as a push notification to user 426.

In some embodiments, a process for processing a user-initiated action via a microapp may operate as follows. Client 202 may receive data from microapp service 430 (via client interface service 416) to render information corresponding to the microapp. Microapp service 430 may receive data from active data cache service 436 to support that rendering. User 426 may invoke an action from the microapp, causing resource access application 424 to send that action to microapp service 430 (via client interface service 416). Microapp service 430 may then retrieve from credential wallet service 434 an encrypted Oauth2 token for the system of record for which the action is to be invoked and may send the action to data integration provider service 432 together with the encrypted Oath2 token. Data integration provider service 432 may then decrypt the Oath2 token and write the action to the appropriate system of record under the identity of user 426. Data integration provider service 432 may then read back changed data from the written-to system of record and send that changed data to microapp service 430. Microapp service 432 may then update active data cache service 436 with the updated data and cause a message to be sent to resource access application 424 (via client interface service 416) notifying user 426 that the action was successfully completed.

In some embodiments, in addition to or in lieu of the functionality described above, resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" Resource management services 402 may, for example, parse these requests and respond because they are integrated with multiple systems on the backend. In some embodiments, users may be able to interact with the virtual assistance through either resource access application 424 or directly from another resource, such as Microsoft Teams. This feature may allow employees to work efficiently, stay organized, and deliver only the specific information they're looking for.

Figure 5:
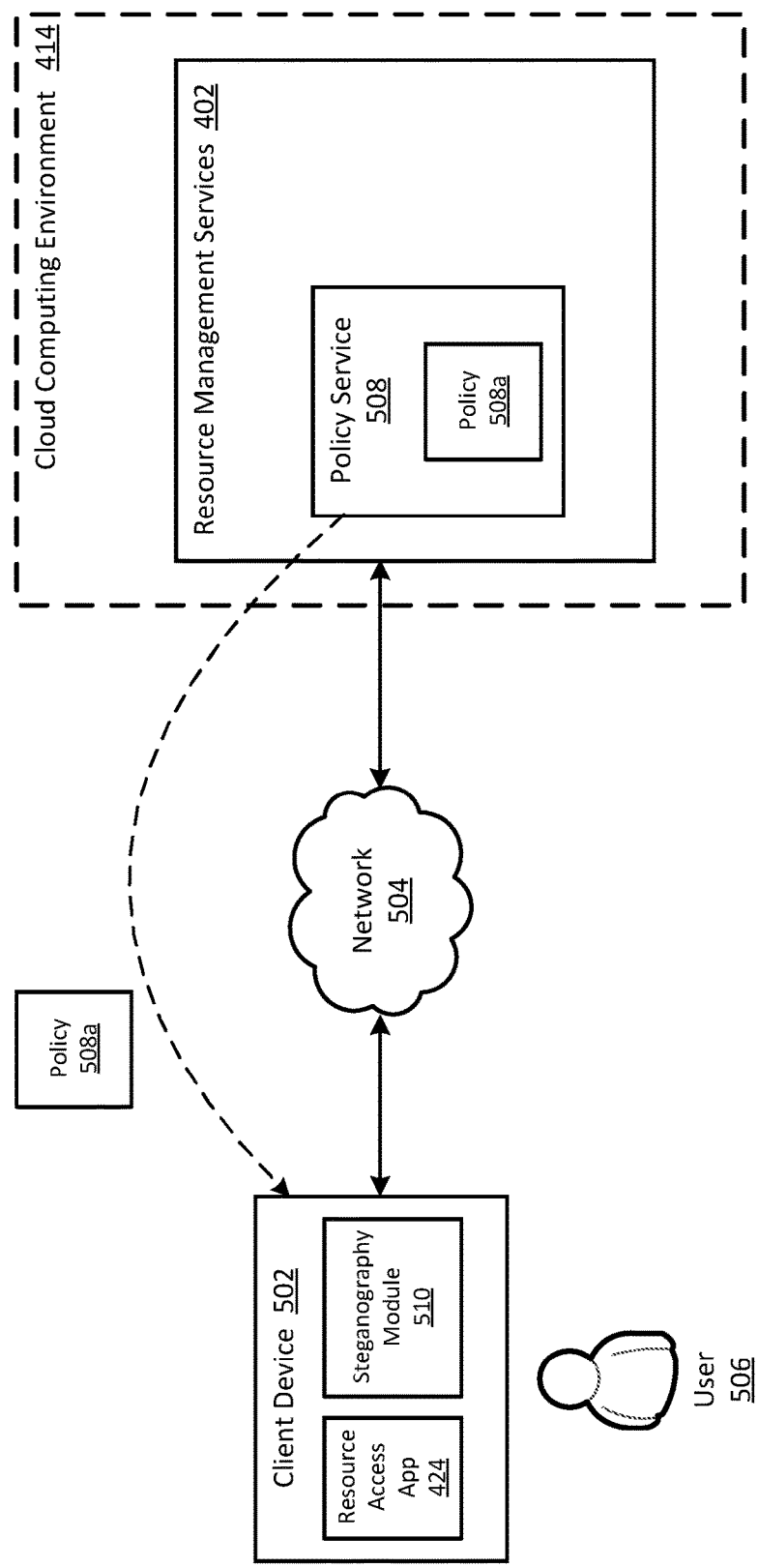
FIG. 5 is a block diagram of an illustrative network environment in which client devices can detect hidden information within an image, in accordance with an embodiment of the present disclosure.

FIG. 5 is a block diagram of an illustrative network environment 500 in which client devices can detect hidden information within an image (e.g., image steganography), in accordance with an embodiment of the present disclosure. In brief, a client device can be understood as providing detection and prevention of image steganography as and when the image steganography is being performed. According to various embodiments disclosed herein, image steganography can be detected by monitoring user and/or tool (e.g., a software or a programming tool) operations on images. Upon detection of possible image steganography, one or more actions can be taken to protect against unauthorized information transfer. For example, access to the image file(s) that contains or includes the image(s) may be blocked or otherwise prohibited. While some embodiments of the present disclosure may be described as detecting and protecting against unauthorized transfer of information via image-based steganography, the techniques disclosed herein may be applied to other types of steganography such as audio steganography.

In FIG. 5, like elements of system 400 of FIGS. 4A-4C are shown using like reference designators. As such, the previous relevant discussion with respect to features of the like elements shown using like reference designators is equally applicable here, including the previous relevant discussion with respect to client 202, resource access application 424, resource management services 402, and cloud computing environment 414.

As shown in FIG. 5, network environment 500 can include one or more client devices 502 communicably coupled to resource management services 402 via a network 504. Network 504 may correspond one or more to wireless or wired computer networks including, but not limited to, local-area networks (LANs), metropolitan area networks (MANs), wide area networks (WANs), wireless local-area networks (WLAN), primary public networks, primary private networks, cellular networks, Wi-Fi (i.e., 802.11) networks, Bluetooth networks, and Near Field Communication (NFC) networks. In some embodiments, network 504 may include another network or a portion or portions of other networks.

Network environment 500 may provide services for one or more organizations, with the organizations having one or more users associated with it. A given client device 502 may be assigned to or otherwise associated with a particular user. For example, as shown in FIG. 5, client device 502 may be assigned to, or otherwise associated with, a user 506. While only one client device 502 and one corresponding user 506 are shown in FIG. 5, the structures and techniques sought to be protected herein can be applied to any number of organizations, users, and devices.

Client device 502 can include smartphones, tablet computers, laptop computers, desktop computers, or other computing devices configured to run user applications (or "apps"). In some embodiments, client device 502 may be substantially similar to client machine 102 described above in the context of FIGS. 1 and 3, computing device 100 described above in the context of FIG. 2, and/or client 202 described above in the context of FIGS. 4A-4C.

With continued reference to, and as shown in FIG. 5, user 506 may access resource management services 402 and other services and network resources (e.g., SaaS applications and web applications) using resource access application 424 installed on client device 502. Resource management services 402 may manage and streamline access to enterprise resources provided by an organization for access and use by users associated with the organization. Resource access application 424 and associated components may provide user 506 with a personalized, all-in-one interface enabling seamless access to the user's resources, such as SaaS and web applications, files, virtual Windows applications, virtual Linux applications, desktops, mobile applications, Citrix Virtual Apps and Desktops™, local applications, and other data. In one example, resource access application 424 may be the CITRIX WORKSPACE app. In an implementation, resource access application 424 may include a web browser for accessing web-based SaaS applications along with other types of web apps and websites.

Resource management services 402 may include a policy service 508. Policy service 508 can maintain policy and other configuration information related to the one or more organizations operating in network environment 500 including security policies defined by the organizations for enforcement within network environment 500. Via policy service 508, an organization can define one or more security policies related to users 506 and devices 502 associated with the organization. As shown in FIG. 5, policy service 508 may include a security policy 508a that includes information for determining corporate resources, such as corporate applications. Corporate resources include applications and resources that are provided by the organization and can include applications and resources managed and provided via resource management services 402. For example, an organization can specify in security policy 508a an intranet uniform resource locator (URL) and/or a domain (e.g., Intranet=*.acme.net). In this case, all the applications in the specified URL/domain may be considered a corporate application. As another example, an organization may specify in security policy 508a a list of one or more applications and resources (e.g., www.acme.corpapp.com, www.appservice.com/acme, and other domains) that are to be considered corporate applications. As another example, an organization may specify in security policy 508a one or more specific applications (e.g., hotmail.com, imagecreator.com, etc.) that are non-corporate (i.e., not a corporate application). In any case, in some implementations, an application or resource that is not identified as being or related to a corporate application in security policy 508a may be considered a non-corporate application.

A security policy targeting a particular user or group of users may be applicable to the device/devices assigned to the user/users. In some embodiments, policy service 508 may identify which of the policies are applicable for which users/devices and deliver applicable security policies (e.g., one or more security policies 508a) to client devices 502 within network environment 500.

For example, and according to an embodiment, user 506 may use resource access application 424 executing on client device 502 to connect to resource management services 402. When resource access application 424 connects to resource management services 402, security policy 508a may be delivered to client device 502. For example, policy service 508 may send or otherwise provide to client device 502 the security policy 518a. Security policy 508a may specify the user's security policies that have been defined, for example, by the user's organization, including actions that are to be performed in cases where possible image steganography is detected to prevent unauthorized transfer or release of information.

As a solution to the aforementioned and other technical problems related to the inability to detect the presence of concealed information in an image, in some embodiments, client device 502 is programmed to or otherwise configured to (e.g., includes a steganography module 510 that is configured to) monitor and detect user operations on images and, upon detection of possible image steganography, provide protection against unauthorized information transfer by prohibiting access to image file(s) that includes the image(s). The user operations on the images can include the use of tools, such as steganography tools, cryptographic tools, and encryption tools, to provide three examples. These monitored user operations include operations on images from which an inference of an occurrence of image modification to hide information or steganography can be made.

For example, according to some embodiments, an application process on client device 502 that is operating on two or more images, where at least one of the images is newly generated by the application process, may serve as a basis for inferring an occurrence of image steganography. Here, the premise is that image steganography applications or tools typically process two (or more) images, where one image is an original image which may already exist (e.g., a carrier image), and the information to be exfiltrated is encoded/encrypted and hidden (concealed) within the original image to generate a new stegno-image. The generated stegno-image looks like the original image but includes the hidden information. A process operating on two or more images in conjunction with utilization of user interface elements that are associated with or otherwise indicative of steganography may provide a stronger basis for inferring an occurrence of image steganography. Examples of such user interface elements include, but are not limited to, elements whose label and/or related content (data) include the text string "stegano", "stegno*", "*password", "extract", "hide", or variants of the aforementioned text strings, where "*" (the asterisk) is a wildcard character which can be interpreted as a number of literal characters or an empty string. In these cases, the premise is that image steganography typically involves the use of two (or more) images, where one image is an original image which already exists (e.g., a carrier image), and the other image is a stegno-image which is newly generated. Moreover, in such cases, the operations on the two images involve the use of a steganography application or tool to generate the stegno-image.

To this end, in such embodiments, steganography module 510 may be configured to detect when a process, such as an application process, and/or its child process(es) executing on client device 502 is performing operations on an image. For example, in an implementation, steganography module 510 may generate a hook procedure (e.g., an operating system API hook) to monitor for and intercept API calls related to the opening and/or accessing of an image. In some such implementations, an open file API call, for instance, can be hooked whereby a shared library (e.g., a dynamic-link library) gets loaded in the process. Then, when the process calls the open file API, a hook callback that is registered with the hook is initiated. API parameters can then be checked to determine whether the opened file is an image file. Generating such hook procedures allows steganography module 510 to determine whether an application is processing or otherwise operating on an image (e.g., an image file that includes the image).

Upon detecting such processing, steganography module 510 may generate scripts or functions (e.g., event listeners) to detect utilization of steganography applications or tools, and corresponding subroutines (e.g., event handlers) that are initiated (or executed) when the event (i.e., detection of the utilization of a steganography application) occurs. For example, steganography module 510 may identify user interface elements of the process (i.e., the process that opened the image and is performing operations on the image) that are associated with or otherwise indicative of steganography (e.g., elements whose label and/or related content (data) include the text string "stegano", "stegno*", "*password", "extract", "hide", or variants of the aforementioned text strings). Steganography module 510 may then generate event listeners on the identified user interface elements to detect the activation of or interaction with the user interface elements since the activation of or interaction with the user interface elements is indicative of utilization of a steganography application or tool. In some cases, the detection of a steganography tool (e.g., with a UI) can be done independently and prior to opening of the image file in the steganography UI tool. In some embodiments, steganography module 510 may use UI automation heuristic techniques to detect utilization of a steganography application or tool. For example, heuristic techniques can be used to detect titles of windows (i.e., window title) and/or names of processes (i.e., process name) that include a text string that is indicative of steganography. Heuristics can also be used to detect buttons or other UI controls having names or labels that include a text string that is indicative of steganography. In any case, upon detecting utilization of a steganography application or tool, steganography module 510 may take an action to prevent the occurrence of possible image steganography (e.g., unauthorized information transfer) according to the security policy specified in an applicable security policy (e.g., security policy 508*a*). For example, the security policy (e.g., security policy 508*a*) may specify that such processes are to be immediately terminated. Additionally or alternatively, the security policy may specify that a user (e.g., user 506) associated with the use of the steganography tool is to be notified that use of such tools are prohibited. As another example, the security policy may specify a threshold number of uses of such tools, after which a notification is to be sent or otherwise provided to an administrator of the use or attempted use of such tools.

As another example, according to some embodiments, a process and/or its child process(es) operating on two or more images (e.g., an application process on client device 502 that is operating on two or more images, where at least one of the images is newly generated by the application process) in conjunction with utilization of a cryptographic and/or encryption application or tool by the process may serve as a basis for inferring an occurrence of image modification to hide information or steganography. Here, the premise is that a process operating on the images typically does not perform or invoke cryptographic or encryption operations. However, image steganography may involve performing cryptographic and/or encryption operations to secure the information that is hidden in a stegno-image and/or the stegno-image itself (e.g., image file that includes the stegno-image). In other words, performing cryptographic and/or encryption operations during the processing of two or more images may be a strong indication of image steganography.

To this end, in such embodiments, steganography module 510 may be configured to detect when a process, such as an application process, executing on client device 502 is performing operations on two or more images. For example, in an implementation, steganography module 510 may generate a hook procedure (e.g., an operating system API hook) to monitor for and intercept API calls related to the opening and/or accessing of an image or images. Generating such hook procedures allows steganography module 510 to determine whether an application is processing or otherwise operating on two or more images (e.g., image files that include the images). The hook procedures also allow steganography module 510 to determine whether one of the images is generated (created) by the application process. For example, an API hook (e.g., a write API hook) may be called to create a new stegno-image file. Upon detecting such processing, steganography module 510 may generate one or more hook procedures (e.g., operating system API hooks) to monitor for and detect (e.g., intercept) utilization of APIs related to cryptographic and/or encryption operations, such as, rfc2898derviebytes, createdecryptor, and cryptostream, to provide three examples. Upon detecting utilization of an API related to cryptographic and/or encryption operations, steganography module 510 may take an action to prevent the occurrence of possible image steganography (e.g., unauthorized information transfer) according to the security policy specified in an applicable security policy (e.g., security policy 508*a*).

As still another example, according to some embodiments, a process operating on two or more images (e.g., an application process on client device 502 that is operating on two or more images, where at least one of the images is newly generated by the application process) in conjunction with a copy event from a corporate application to pass data to a non-corporate application may serve as a basis for inferring an occurrence of image steganography. Here, the premise is that a process operating on the images to generate a stegno-image is likely to be a non-corporate application, and the information that is hidden in the stegno-image likely originates from or is provided by a corporate application. For example, a corporation's SaaS project management application is likely to contain sensitive or confidential information which may be hidden in a stegno-image. Moreover, such information may be transferred from the corporate application to the non-corporate application (i.e., the process operating on the images to generate the stegno-image) using a copy-and-paste or cut-and-paste operation.

To this end, in such embodiments, steganography module 510 may be configured to detect when a process, such as an application process, executing on client device 502 is performing operations on two or more images. For example, in an implementation, steganography module 510 may generate a hook procedure (e.g., an operating system API hook) to monitor for and intercept API calls related to the opening and/or accessing of an image or images. Generating such hook procedures allows steganography module 510 to determine whether an application is processing or otherwise operating on two or more images (e.g., image files that include the images). The hook procedures also allow steganography module 510 to determine whether one of the images is generated (created) by the application process. Upon detecting such processing, steganography module 510 may generate hook procedures (e.g., clipboard event API hooks) to hook into the common clipboard operations of cutting, copying, and pasting. Using the clipboard event API hooks, steganography module 510 is able to detect cut and/or copy events by a corporate application and paste events by a non-corporate application. Steganography module 510 can determine whether a process performing the cut, copy, or paste operation is a corporate application or a non-corporate application based on the information contained in security policy 508*a*. In cases where the non-corporate application or tool implements a command line interface (i.e., command line non-corporate application or tool), the paste event may occur in a command shell and then be passed to the actual non-corporate application or tool. For such command line non-corporate applications or tools, steganography module 510 may capture the paste event to the command line non-corporate application or tool by comparing the command line to the paste data coming from the corporate application. In any case, upon detecting a cut or copy event by a corporate application and a paste event by a non-corporate application, steganography module 510 may take an action to prevent the occurrence of possible image steganography (e.g., unauthorized information transfer) according to the security policy specified in an applicable security policy (e.g., security policy 508*a*).

In some embodiments, steganography module 510 may be configured to detect when a process, such as an application process, executing on client device 502 is operating on two or more images and performing one or more events that are indicative of image steganography and, upon detecting such process, analyze the images for possible least significant bit (LSB) image steganography. The events indicative of image steganography include the process being in the foreground (or active) on client device 502, utilization of an API related to cryptographic and/or encryption operations by the process, a copy (or cut) event by a corporate application and a paste event by a non-corporate application, and utilization of a user interface element that is associated with or otherwise indicative of steganography. Note that, different from the example cases described above, the process may or may not have generated any of the images that are being operated on by the process. In these cases, the premise is that an occurrence of a process operating on two or more images in conjunction with any one of the events that are indicative image steganography warrants further analysis of the images for possible LSB image steganography.

For example, to determine whether a process operating on two or more images is in the foreground (or active), steganography module 510 may generate a script or function (e.g., an application foreground event listener) to detect when the process (i.e., the process operating on two or more images) is in the foreground (or active), and a corresponding subroutine (e.g., application foreground event handler) that is initiated (or executed) when the application foreground event occurs. The application foreground event listener generated for the process listens for and detects when the process is in the foreground. Steganography module 510 may generate and utilize hooks, such as API hooks, and event listeners/handlers to detect the events indicative of image steganography (e.g., utilization of a cryptographic and/or encryption API, cut, copy, and paste events, and utilization of a user interface element associated with or otherwise indicative of steganography), as previously described herein.

Upon detecting a process executing on client device 502 operating on two or more images and performing one or more events that are indicative of image modification to hide information or steganography, steganography module 510 may analyze the images for possible LSB image steganography. In some embodiments, steganography module 510 may analyze the images for possible LSB image steganography subsequent to file close events on the image files that contain the images. LSB image steganography is an image steganography technique in which messages (e.g., information) are hidden within the LSB plane of the image. For example, in one implementation of LSB image steganography, a message is hidden inside an image by replacing each pixel's LSB with the bits of the message to be hidden. Since this will only affect each pixel by a value of plus or minus 1, if at all, the degradation to the image caused by this embedding process would be perceptually minimal. That is, changing the value of the LSB of the pixels in an image should not make much of a difference in the visual appearance of the image.

In some embodiments, steganography module 510 may analyze the images for indication of LSB image steganography by first comparing the most significant bits (MSBs) of each pixel of each image with the MSBs of each pixel of the other images. The MSBs of a pixel are the bits that are not (other than) the LSBs of the pixel. For example, suppose each pixel includes 8 bits (bit 0 to bit 7) and bit 0 is the LSB of a pixel. In this example case, the MSBs of the pixel include the other 7 bits, bit 1 to bit 7. If the LSBs of a pixel include 2 bits, bit 0 and bit 1, the MSBs of the pixel include the other 6 bits, bit 2 to bit 7, and so on. Note that the LSBs of a pixel can include the least significant bit of a pixel, the least significant 2 bits of a pixel, the least significant 3 bits of a pixel, and so on. Also note that the degradation to the image caused by the embedding process increases as a larger number of bits are designated to be the LSBs of a pixel.

To compare the MSBs of each pixel of the images, steganography module 510 may compare each image with each of the other images. For example, in the case of two (2) images, images A and B, the MSBs of each pixel in image A is compared with the MSBs of a corresponding pixel in image B. In the case of three (3) images, images A, B, and C, the MSBs of each pixel in image A is compared with the MSBs of a corresponding pixel in image B, the MSBs of each pixel in image A is compared with the MSBs of a corresponding pixel in image C, and the MSBs of each pixel in image B is compared with the MSBs of a corresponding pixel in image C.

In the case where the MSBs of the pixels of two (2) images are determined to be the same, steganography module 510 may then compare the LSBs of each pixel in one of the two (2) images with the LSBs of a corresponding pixel in the other of the two (2) images. For example, in the case of an image A and image B, steganography module 510 may compare the LSBs of each pixel in image A with the LSBs of a corresponding pixel in image B. If the LSBs of the pixels in the two (2) images are determined to be not the same (i.e., different), steganography module 510 may determine that LSB image steganography is likely to have occurred and that a stegno-image was generated. For example, the stegno-image may include one or more null bytes (e.g., bytes having a zero (0) value)) to indicate the end of the hidden or encrypted message in the stegno-image. As another example, the stegno-image may include a large or significant number of consecutive pixels having a value of xero (0). It is appreciated that other indications of steganography may be detected to identify which of the two images (e.g., image A and image B in the example above) is the stegno-image. Upon determining that LSB image steganography is likely to have occurred, steganography module 510 may take an action to prevent the possible unauthorized information transfer according to the security policy specified in an applicable security policy (e.g., security policy 508*a*).

In the case where the MSBs of the pixels of two (2) images are determined to be the same, in some embodiments, steganography module 510 may check the LSBs of the pixels in each of the two (2) images to determine whether the LSBs of the pixels have a value of zero (0) from a specific point in the image to the end of the image. If steganography module 510 determines that an image has pixels whose LSBs have a value of zero (0) from a specific point in the image to the end of the image, steganography module 510 can determine that this image is likely a stegno-image. Here, the premise is that a LSB image stenographic process typically includes zeroing out the LSBs of an image prior to hiding the message (e.g., information) in the image. Upon determining that one of the two (2) images is likely to be a stegno-image, steganography module 510 may take an action to prevent the possible unauthorized information transfer according to the security policy specified in an applicable security policy (e.g., security policy 508a).

In some embodiments, an organization may specify a threshold percentage, such as 95 percent, 90 percent, 85 percent, 75 percent, or any other suitable percentage, that need to match in order for the MSBs of the pixels of two (2) images to be determined to be the same. For example, the organization may specify the threshold percentage in a security policy (e.g., security policy 508a). In such embodiments, upon determining that the MSBs of the pixels of two (2) images are the same based on the specified threshold percentage (i.e., the percentage of the MSBs of the pixels that match satisfies the specified threshold percentage), steganography module 510 may identify the portions of the two (2) images in which the pixels have the same MSBs. Then, for the pixels in these portions of the two (2) images, steganography module 510 may compare the LSBs of each pixel in one of the two (2) images with the LSBs of a corresponding pixel in the other of the two (2) images. If the LSBs of the pixels in these portions of the two (2) images (i.e., the portions of the images in which the MSBs of the pixels are the same) are determined to be not the same, steganography module 510 may determine that LSB image modification or steganography is likely to have occurred and that a stegno-image was generated. Upon determining that LSB image steganography is likely to have occurred, steganography module 510 may take an action to prevent the possible unauthorized information transfer according to the security policy specified in an applicable security policy (e.g., security policy 508a).

In response to detecting (or determining) possible image steganography, including possible LSB image steganography, steganography module 510 may take various actions to prevent unauthorized transfer of information. For example, steganography module 510 may issue a system call (e.g., an IOCTL) to the underlying operating system (OS) to block access to the stegno-image. As another example, steganography module 510 may send or otherwise provide to a security operations center of the organization a notification of the possible occurrence of image steganography. As still another example, steganography module 510 may delete the stegno-image (e.g., a file that contains the stegno-image).

Figure 6:
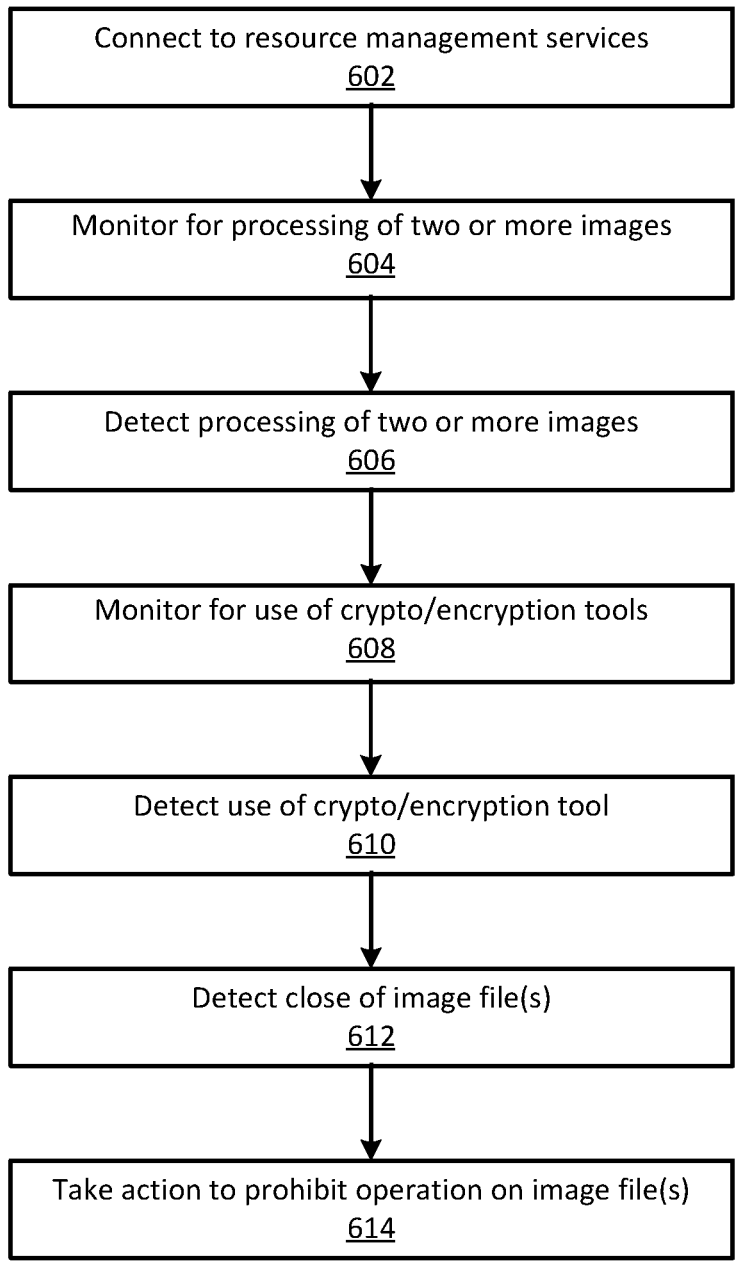
FIG. 6 is a flow diagram of an illustrative process for detecting information hidden within an image with use of cryptography/encryption operations, in accordance with an embodiment of the present disclosure.

FIG. 6 is a flow diagram of an illustrative process 600 for detecting information hidden within an image steganography with use of cryptography/encryption operations, in accordance with an embodiment of the present disclosure. Example process 600, and example processes 700, 800, and 900 further described below, may be implemented or used within a computing environment or system such as those disclosed above at least with respect to FIG. 1, FIG. 2, FIG. 3, FIGS. 4A-4C and/or FIG. 5. For example, in some embodiments, the operations, functions, or actions illustrated in example process 600, and example processes 700, 800, and 900 further described below, may be stored as computer-executable instructions in a computer-readable medium, such as volatile memory 122 and/or non-volatile memory 128 of computing device 100 of FIG. 2 (e.g., computer-readable medium of client machines 102 of FIG. 1, client machines 102a-102n of FIG. 3, clients 202 of FIGS. 4A-4C, and/or client device 502 of FIG. 5). For example, the operations, functions, or actions described in the respective blocks of example process 600, and example processes 700, 800, and 900 further described below, may be implemented by applications 116 and/or data 117 of computing device 100.

With reference to process 600 of FIG. 6, at 602, a user, such as user 506, may execute resource access application 424 on client device 502, and use resource access application 424 to connect to resource management services 402. Upon connecting to resource management services 424, client device 502 may receive security policy 510a. For example, policy service 510 of resource management services 402 may send or otherwise provide to client device 502 the security policy 510a. Security policy 510a may specify the actions that are to be performed in cases where possible image modification to hide information (e.g., image steganography) is detected to prevent unauthorized transfer of information. Resource management services 402 may also send or otherwise provide to client device 502 the steganography module 510 for execution on client device 502. In some implementations, steganography module 510 may be integrated as part of or into resource access application 424.

At 604, steganography module 510 on client device 502 may monitor for the processing of two or more images. For example, steganography module 510 may generate one or more hook procedures (e.g., API hooks) to monitor for a process (e.g., application process) that is processing or otherwise operating on two or more images. Steganography module 510 may also generate a hook procedure (e.g., API hook) to monitor for the generating (creating) of a new image (e.g., image file).

At 606, steganography module 510 may detect the processing of two or more images. For example, using the generated hook procedures, steganography module 510 may detect an application that is processing two or more images. Steganography module 510 may also determine that at least one of the images that is being processed was newly generated. In an example use case, user 506 may use client device 502 to access and utilize application software (e.g., image processing application software such as an image editing application) to operate on two or more images.

Upon detection of such a process on client device 502, at 608, steganography module 510 may monitor for the use of a cryptographic and/or encryption tool. For example, steganography module 510 may generate one or more hook procedures (e.g., API hooks) to monitor for the use of an API related to cryptographic and/or encryption operation. Examples of such APIs include rfc2898derviebytes, createdecryptor, and cryptostream.

At 610, steganography module 510 may detect the use of a cryptographic and/or encryption tool. For example, using the generated hook procedures, steganography module 510 may detect the utilization of an API related to a cryptographic and/or encryption operation. Continuing the example use case above, while working on the images, user 506 may use the application to invoke a cryptographic tool to encrypt data, for example. In response to detection of the utilization of such a tool on client device 502, steganography module 510 may note or otherwise record that a cryptographic and/or encryption-related API was utilized (called). Steganography module 510 may then wait for the one or more files (e.g., image files) that contain the images that are being operated on by the process to be closed. For example, steganography module 510 may monitor for file close events on the images.

At 612, steganography module 510 may detect the closing of an image file that contains one or more of the images that were being operated on by the process. For example, steganography module 510 may hook into an API call (e.g., a close file API call) to detect the closing of such an image file. Note that an image file may need to be closed in order for steganography module 510 to be able to initiate an action on the image file. In other embodiments, 612 may be optional. For example, in cases where steganography module 510 can initiate an appropriate action on an image file prior to the image file being closed, steganography module 510 need not wait for the image file to be closed.

At 614, steganography module 510 may initiate one or more actions to prevent operations on or use of the image file. For example, steganography module 510 may issue a system call (e.g., an IOCTL) to the underlying operating system (OS) on client device 502 to block or otherwise restrict access to the image file that contains the stegno-image. Steganography module 510 may also send or otherwise provide to a security operations center of the organization a notification of the possible occurrence of image steganography.

Note that, in the case where there are multiple image files that contain the images that were being operated on by the process, steganography module 510 may wait for one of the image files to be closed and initiate the one or more actions to prevent use of the closed image file. That is, steganography module 510 need not wait for all of the multiple image files to be closed before initiating the one or more actions. However, steganography module 510 may need to perform the operations at 612 and 614 multiple times based on the number of image files that contain the images that were being operated on by the process. In other implementations, steganography module 510 may wait for all the images files that contain the images that were being operated on by the process to be closed before initiating the one or more actions to prevent use of the image files.

Figure 7:
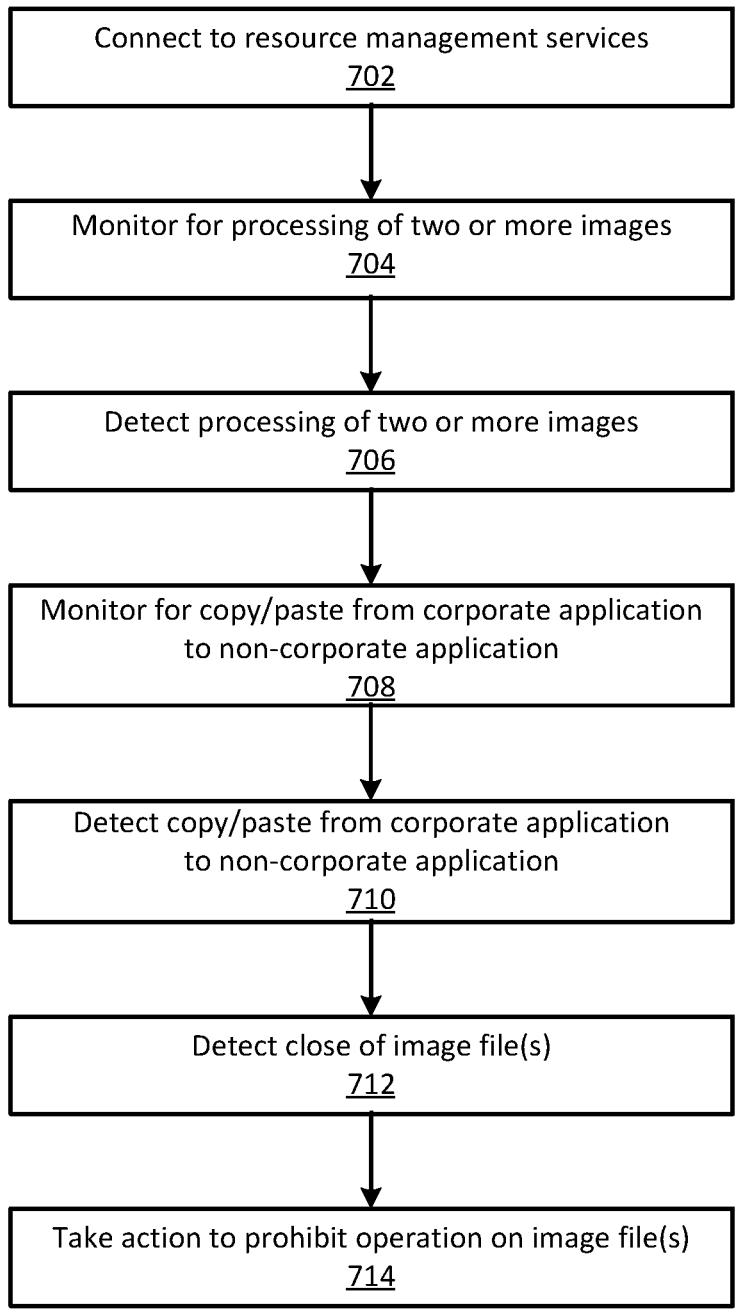
FIG. 7 is a flow diagram of an illustrative process for detecting information hidden within an image with use of clipboard operations, in accordance with an embodiment of the present disclosure.

FIG. 7 is a flow diagram of an illustrative process 700 for detecting information hidden within an image with use of clipboard operations, in accordance with an embodiment of the present disclosure. At 702, a user, such as user 506, may execute resource access application 424 on client device 502, and use resource access application 424 to connect to resource management services 402. Upon connecting to resource management services 424, client device 502 may receive security policy 510*a*. For example, policy service 510 of resource management services 402 may send or otherwise provide to client device 502 the security policy 510*a*. Security policy 510*a* may specify the actions that are to be performed in cases where possible image modification to hide information (e.g., image steganography) is detected to prevent unauthorized transfer of information. Security policy 510*a* may also specify the organization's corporate applications and/or non-corporate applications. Resource management services 402 may also send or otherwise provide to client device 502 the steganography module 510 for execution on client device 502. In some implementations, steganography module 510 may be integrated as part of or into resource access application 424.

At 704, steganography module 510 on client device 502 may monitor for the processing of two or more images. For example, steganography module 510 may generate one or more hook procedures (e.g., API hooks) to monitor for a process (e.g., application process) that is processing or otherwise operating on two or more images. Steganography module 510 may also generate a hook procedure (e.g., API hook) to monitor for the generating (creating) of a new image (e.g., image file).

At 706, steganography module 510 may detect the processing of two or more images. For example, using the generated hook procedures, steganography module 510 may detect an application that is processing two or more images. Steganography module 510 may also determine that at least one of the images that is being processed was newly generated. In an example use case, user 506 may use client device 502 to access and utilize application software (e.g., image processing application software such as an image editing application) to operate on two or more images.

Upon detection of such a process on client device 502, at 708, steganography module 510 may monitor for a copy and paste from a corporate application to a non-corporate application. For example, steganography module 510 may generate one or more hook procedures (e.g., clipboard event API hooks) to hook into and monitor for actions such as, for example, cut, copy, and paste clipboard operations, to monitor for a copy (or cut) event by a corporate application and a paste event by a non-corporate application.

At 710, steganography module 510 may detect a copy and paste from a corporate application to a non-corporate application. For example, using the generated clipboard event API hooks (or clipboard listeners), steganography module 510 may detect a copy (or cut) event by a corporate application and a paste event by a non-corporate application. Continuing the example use case above, while working on the images, user 506 may use client device 502 to perform a copy-and-paste (or a cut-and-paste) action or operation from a corporate application to a non-corporate application (e.g., the application that user 506 is using to operate on the two or more images), for example. In response to detection of such a copy-and-paste (or a cut-and-paste) action or operation, steganography module 510 may note or otherwise record that a copy-and-paste (or a cut-and-paste) operation was performed. Steganography module 510 may then wait for the one or more files (e.g., image files) that contain the images that are being operated on by the process to be closed. For example, steganography module 510 may monitor for file close events on the images.

At 712, steganography module 510 may detect the closing of an image file that contains one or more of the images that were being operated on by the process. At 714, steganography module 510 may initiate one or more actions to prevent operations on or use of the image file. For example, steganography module 510 may issue a system call (e.g., an IOCTL) to the underlying operating system (OS) on client device 502 to block or otherwise restrict access to the image file that contains the stegno-image. Steganography module 510 may also send or otherwise provide to a security operations center of the organization a notification of the possible occurrence of image steganography.

Note that, in the case where there are multiple image files that contain the images that were being operated on by the process, steganography module 510 may wait for one of the image files to be closed and initiate the one or more actions to prevent use of the closed image file. That is, steganography module 510 need not wait for all of the multiple image files to be closed before initiating the one or more actions. However, steganography module 510 may need to perform the operations at 712 and 714 multiple times based on the number of image files that contain the images that were being operated on by the process. In other implementations, steganography module 510 may wait for all the images files that contain the images that were being operated on by the process to be closed before initiating the one or more actions to prevent use of the image files.

Figure 8:
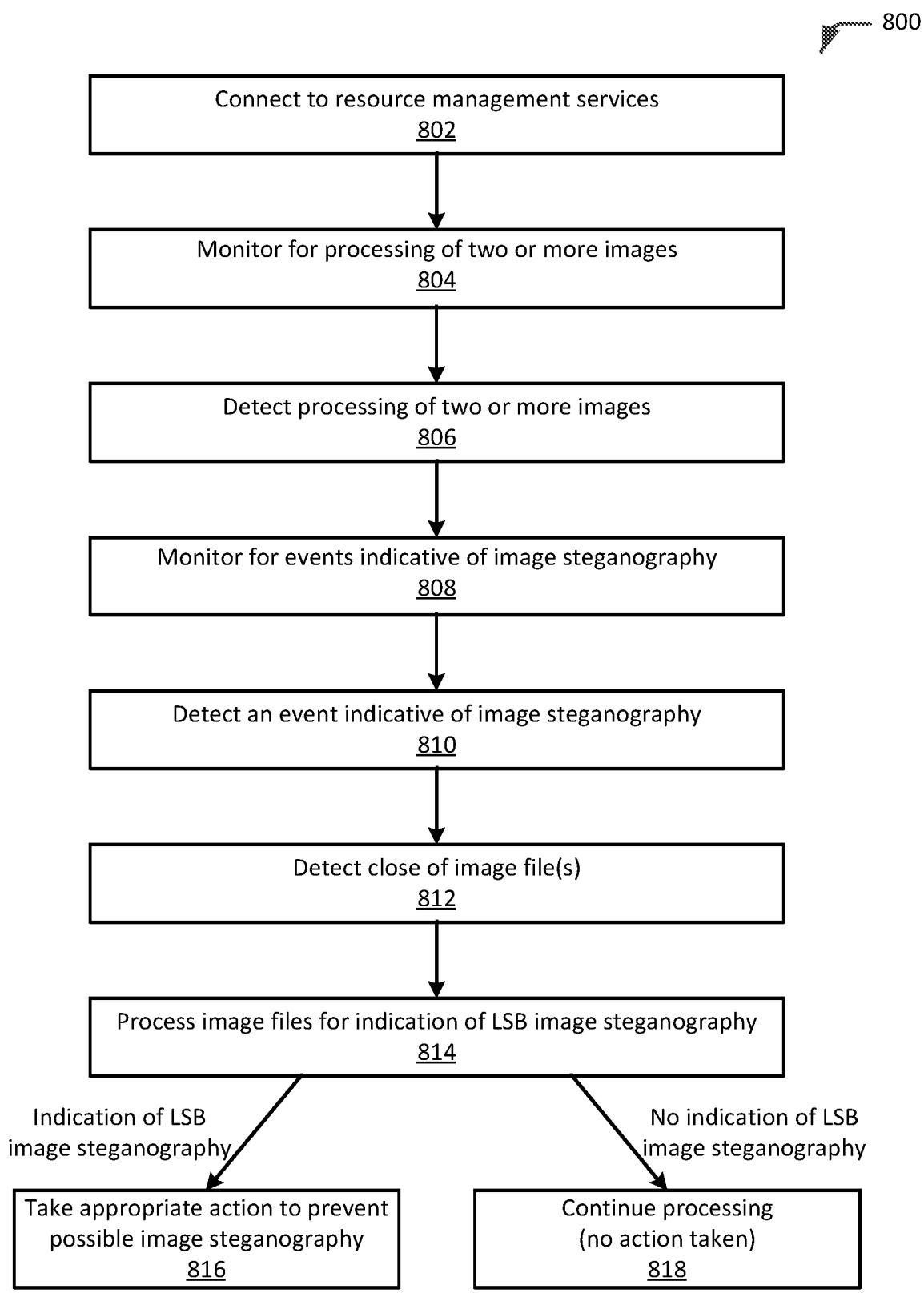
FIG. 8 is a flow diagram of an illustrative process for detecting information hidden within an image with use of least significant bit (LSB) techniques, in accordance with an embodiment of the present disclosure.

FIG. 8 is a flow diagram of an illustrative process 800 for detecting information hidden within an image with use of least significant bit (LSB) techniques, in accordance with an embodiment of the present disclosure. At 802, a user, such as user 506, may execute resource access application 424 on client device 502, and use resource access application 424 to connect to resource management services 402. Upon connecting to resource management services 424, client device 502 may receive security policy 510a. For example, policy service 510 of resource management services 402 may send or otherwise provide to client device 502 the security policy 510a. Security policy 510a may specify the actions that are to be performed in cases where possible image modification to hide information (e.g., image steganography) is detected to prevent unauthorized transfer of information. Security policy 510a may also specify the organization's corporate applications and/or non-corporate applications. Resource management services 402 may also send or otherwise provide to client device 502 the steganography module 510 for execution on client device 502. In some implementations, steganography module 510 may be integrated as part of or into resource access application 424.

At 804, steganography module 510 on client device 502 may monitor for the processing of two or more images. For example, steganography module 510 may generate one or more hook procedures (e.g., API hooks) to monitor for a process (e.g., application process) that is processing or otherwise operating on two or more images. At 806, steganography module 510 may detect the processing of two or more images. For example, using the generated hook procedures, steganography module 510 may detect an application that is processing two or more images. For example, the process may include application software (e.g., image processing application software such as an image editing application) accessed and utilized by user 506 of client device 502 to operate on two or more images.

Upon detection of such a process on client device 502, at 808, steganography module 510 may monitor for events that are indicative of image steganography. For example, steganography module 510 may generate one or more hook procedures and event listeners and corresponding handlers to detect events that are indicative of image steganography. Examples of such events include utilization of a cryptographic and/or encryption API, cut, copy, and paste actions, and utilization of a user interface element associated with or otherwise indicative of steganography.

At 810, steganography module 510 may detect an event that is indicative of image steganography. For example, using the generated hook procedures and event listeners and corresponding handlers, steganography module 510 may detect an event that is indicative of image steganography. Continuing the example above, while working on the images, user 506 may use the application to invoke a cryptographic tool to encrypt data, for example. As another example, user 506 may use client device 502 to perform a copy-and-paste (or a cut-and-paste) action or operation from a corporate application to a non-corporate application (e.g., the application that user 506 is using to operate on the two or more images). In response to detection of such an action, steganography module 510 may note or otherwise record that an event that is indicative of image steganography was detected. Steganography module 510 may then wait for the one or more files (e.g., image files) that contain the images that are being operated on by the process to be closed.

At 812, steganography module 510 may detect the closing of the image file or files that contain the one or more of the images that were being operated on by the process. At 814, steganography module 510 may process the image files for an indication of LSB image steganography, as previously described herein.

If it is determined that there is an indication of LSB image steganography, then, at 816, steganography module 510 may initiate one or more actions to prevent the detected LSB image steganography (i.e., prevent the possible unauthorized information transfer). For example, steganography module 510 may issue a system call (e.g., an IOCTL) to the underlying operating system (OS) on client device 502 to block or otherwise restrict access to the image file or files. As another example, steganography module 510 may issue a system call to the underlying OS on client device 502 to block or otherwise restrict further use of the tools and/or applications used to generate the stegno-image. Steganography module 510 may also send or otherwise provide to a security operations center of the organization a notification of the possible occurrence of LSB image steganography.

Otherwise, if it is determined that there is no indication of LSB image steganography, then, at 818, steganography module 510 may not initiate any action to prevent operations on or use of the image file or files. In this case, no further action is taken since possible LSB image steganography was not detected.

Figure 9:
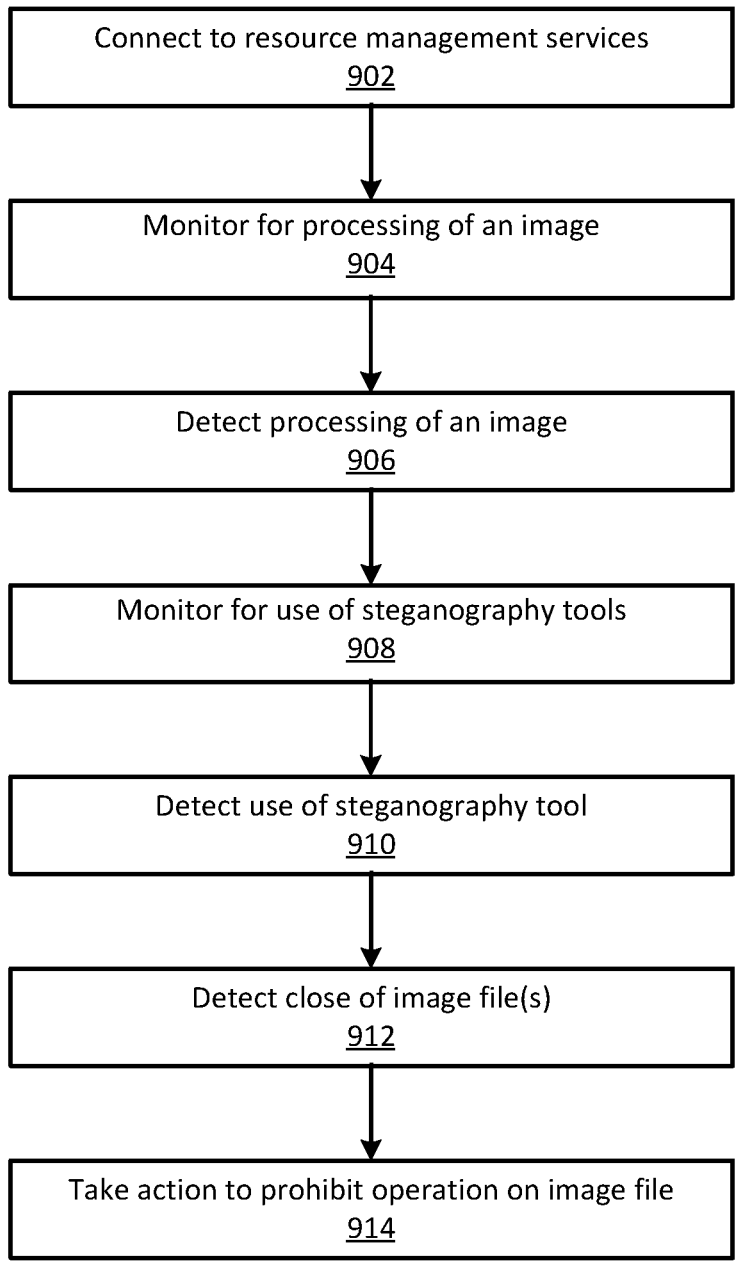
FIG. 9 is a flow diagram of an illustrative process for detecting information hidden within an image with use of a steganography tool, in accordance with an embodiment of the present disclosure.

FIG. 9 is a flow diagram of an illustrative process 900 for detecting information hidden within an image with use of a steganography tool, in accordance with an embodiment of the present disclosure. At 902, a user, such as user 506, may execute resource access application 424 on client device 502, and use resource access application 424 to connect to resource management services 402. Upon connecting to resource management services 424, client device 502 may receive security policy 510a. For example, policy service 510 of resource management services 402 may send or otherwise provide to client device 502 the security policy 510a. Security policy 510a may specify the actions that are to be performed in cases where possible image modification to hide information (e.g., image steganography) is detected to prevent unauthorized transfer of information. Resource management services 402 may also send or otherwise provide to client device 502 the steganography module 510 for execution on client device 502. In some implementations, steganography module 510 may be integrated as part of or into resource access application 424.

At 904, steganography module 510 on client device 502 may monitor for the processing of an image. For example, steganography module 510 may generate one or more hook procedures (e.g., API hooks) to monitor for a process (e.g., application process) that is processing or otherwise operating on an image. At 906, steganography module 510 may detect the processing of an image. For example, using the generated hook procedures, steganography module 510 may detect an application that is processing at least one image. For example, the process may be application software (e.g., image processing application software such as an image editing application) accessed and utilized by user 506 of client device 502 to operate on an image.

Upon detection of such a process on client device 502, at 908, steganography module 510 may monitor for the use of steganography applications or tools. For example, steganography module 510 may generate one or more event listeners to detect utilization of steganography applications or tools, and corresponding event handlers that are initiated (or executed) when the event (i.e., detection of the utilization of a steganography application or tool) occurs. For example, steganography module 510 may generate event listeners on user interface elements (e.g., elements whose label and/or related content (data) include the text string "stegano", "stegno*", "*password", "extract", "hide", or variants of the aforementioned text strings) that are associated with or otherwise indicative of steganography. These user interface elements may be elements in an application window of the process that is processing or otherwise operating on an image. Steganography module 510 may use the generated event listeners to detect utilization of a steganography application or tool. As another example, steganography module 510 may scan and/or analyze the clanged UI elements of the process to detect utilization of a steganography application or tool.

At 910, steganography module 510 may detect the use of a steganography application or tool. For example, using the generated event listeners, steganography module 510 may detect utilization of a steganography application or tool. Continuing the example above, while working on the image, user 506 may select, click, or otherwise activate a user interface element to invoke a steganography tool to generate a stegno-image, for example.

In response to detection of a utilization of a steganography application or tool, at 912, steganography module 510 may initiate one or more actions to prevent operations on or use of an image file that contains the image (e.g., stegno-image). In some embodiments, steganography module 510 may wait for the image file to be closed before initiating the actions to prevent operations on or use of the image file. For example, steganography module 510 may issue a system call (e.g., an IOCTL) to the underlying operating system (OS) on client device 502 to block or otherwise restrict access to the image file that contains the stegno-image. Steganography module 510 may also send or otherwise provide to a security operations center of the organization a notification of the possible occurrence of image steganography.

Further Example Embodiments

The following examples pertain to further embodiments, from which numerous permutations and configurations will be apparent.

Example 1 includes a method including: determining, by a computing device, that an application process includes use of a first image and a second image, one of the first and second images being generated as part of the application process; detecting, by the computing device, a difference in content of the first image or the second image based on a comparison of the first and second images; and revoking, by the computing device, access to a file that includes at least one of the first and second images based on the detection of the difference in content of one of the first and second images.

Example 2 includes the subject matter of Example 1, wherein detecting a difference in content of the first image or the second image based on a comparison of the first and second images is in response to a determination of one or more indications of image steganography related to the application process.

Example 3 includes the subject matter of Example 2, wherein the one or more indications of image steganography related to the application process includes a detection that a window of the application process is a foreground window.

Example 4 includes the subject matter of any of Examples 2 and 3, wherein the one or more indications of image steganography related to the application process includes a detection of a use of an encryption application programming interface (API) by the application process.

Example 5 includes the subject matter of any of Examples 2 through 4, wherein the one or more indications of image steganography related to the application process includes a detection of a copy and paste of content from a corporate application to a non-corporate application.

Example 6 includes the subject matter of any of Examples 2 through 5, wherein the one or more indications of image steganography related to the application process includes a detection of a use of a user interface (UI) element indicative of steganography.

Example 7 includes the subject matter of any of Examples 1 through 6, wherein the comparison of the first and second images includes a comparison of least significant bits (LSBs) of the first and second images.

Example 8 includes the subject matter of any of Examples 1 through 6, wherein the comparison of the first and second images includes a comparison of most significant bits (MSBs) of the first and second images and a comparison of least significant bits (LSBs) of the first and second images.

Example 9 includes the subject matter of any of Examples 1 through 8, wherein detecting a difference in content of the first image or the second image based on a comparison of the first and second images is in response to detecting a close of a first file including the first image and a close of a second file including the second image.

Example 10 includes a system including a memory and one or more processors in communication with the memory and configured to: determine that an application process includes use of a first image and a second image, one of the first and second images being generated as part of the application process; detect a difference in content of the first image or the second image based on a comparison of the first and second images; and revoke access to a file that includes at least one of the first and second images based on the detection of the difference in content of one of the first and second images.

Example 11 includes the subject matter of Example 10, wherein to detect a difference in content of the first image or the second image based on a comparison of the first and second images is in response to a determination of one or more indications of image steganography related to the application process.

Example 12 includes the subject matter of Example 11, wherein the one or more indications of image steganography related to the application process includes a detection that a window of the application process is a foreground window.

Example 13 includes the subject matter of any of Examples 11 and 12, wherein the one or more indications of image steganography related to the application process includes a detection of a use of an encryption application programming interface (API) by the application process.

Example 14 includes the subject matter of any of Examples 11 through 13, wherein the one or more indications of image steganography related to the application process includes a detection of a copy and paste of content from a corporate application to a non-corporate application.

Example 15 includes the subject matter of any of Examples 11 through 14, wherein the one or more indications of image steganography related to the application process includes a detection of a use of a user interface (UI) element indicative of steganography.

Example 16 includes the subject matter of any of Examples 10 through 15, wherein the comparison of the first and second images includes a comparison of least significant bits (LSBs) of the first and second images.

Example 17 includes the subject matter of any of Examples 10 through 15, wherein the comparison of the first and second images includes a comparison of most significant bits (MSBs) of the first and second images and a comparison of least significant bits (LSBs) of the first and second images.

Example 18 includes the subject matter of any of Examples 10 through 17, wherein to detect a difference in content of the first image or the second image based on a comparison of the first and second images is in response to detection of a close of a first file including the first image and a close of a second file including the second image.

Example 19 includes a method including: determining, by a computing device, that an application process includes use of a plurality of images, one of the plurality being generated as part of the application process; detecting, by the computing device, a call to encrypt content included in a file, the call being initiated as part of the application process, and the file including one of the plurality of images; and revoking, by the computing device, access to the file based on the detected call to encrypt the file and use, by the application process, of the plurality of images.

Example 20 includes the subject matter of Example 19, wherein revoking access to the file is in response to a closing of the file.

Example 21 includes the subject matter of any of Examples 19 and 20, further comprising: detecting, by the computing device, a copy and paste of content from a corporate application to a non-corporate application; and revoking, by the computing device, access to the file based on the detected copy and paste of content from the corporate application to the non-corporate application and use, by the application process, of the plurality of images.

Example 22 includes a system including a memory and one or more processors in communication with the memory and configured to: determine that an application process includes use of a plurality of images, one of the plurality being generated as part of the application process; detect a call to encrypt content included in a file, the call being initiated as part of the application process, and the file including one of the plurality of images; and revoke access to the file based on the detected call to encrypt the file and use, by the application process, of the plurality of images.

Example 23 includes the subject matter of Example 22, wherein to revoke access to the file is in response to detection of a close of the file.

Example 24 includes the subject matter of any of Examples 22 and 23, wherein the one or more processors are further configured to: detect a copy and paste of content from a corporate application to a non-corporate application; and revoke access to the file based on the detected copy and paste of content from the corporate application to the non-corporate application and use, by the application process, of the plurality of images.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:
    determining, by a computing device, that an application process includes use of a first image and a second image, one of the first and second images being generated as part of the application process;
    detecting, by the computing device, a difference in content of the first image or the second image based on a comparison of the first and second images, the comparison of the first and second images being in response to one or more indications of image steganography related to the application process including at least a detection of a use of an encryption application programming interface (API) by the application process; and
    revoking, by the computing device, access to a file that includes at least one of the first and second images based on the detection of the difference in content of one of the first and second images.

2. The method of claim 1, wherein the one or more indications of image steganography related to the application process includes a detection that a window of the application process is a foreground window.

3. The method of claim 1, wherein the one or more indications of image steganography related to the application process includes a detection of a copy and paste of content from a corporate application to a non-corporate application.

4. The method of claim 1, wherein the one or more indications of image steganography related to the application process includes a detection of a use of a user interface (UI) element indicative of steganography.

5. The method of claim 1, wherein the comparison of the first and second images includes a comparison of least significant bits (LSBs) of the first and second images.

6. The method of claim 1, wherein the comparison of the first and second images includes a comparison of most significant bits (MSBs) of the first and second images and a comparison of least significant bits (LSBs) of the first and second images.

7. The method of claim 1, wherein the comparison of the first and second images is in response to detecting a close of a first file including the first image and a close of a second file including the second image.

8. A system comprising:
    a memory; and
    one or more processors in communication with the memory and configured to;
        determine that an application process includes use of a first image and a second image, one of the first and second images being generated as part of the application process;
        detect a difference in content of the first image or the second image based on a comparison of the first and second images, the comparison of the first and second images being in response to one or more indications of image steganography related to the application process including at least a detection of a use of a user interface (UI) element indicative of steganography; and
        revoke access to a file that includes at least one of the first and second images based on the detection of the difference in content of one of the first and second images.

9. The system of claim 8, wherein the one or more indications of image steganography related to the application process includes a detection that a window of the application process is a foreground window.

10. The system of claim 8, wherein the one or more indications of image steganography related to the application process includes a detection of a use of an encryption application programming interface (API) by the application process.

11. The system of claim 8, wherein the one or more indications of image steganography related to the application process includes a detection of a copy and paste of content from a corporate application to a non-corporate application.

12. The system of claim 8, wherein the comparison of the first and second images includes a comparison of least significant bits (LSBs) of the first and second images.

13. The system of claim 8, wherein the comparison of the first and second images includes a comparison of most significant bits (MSBs) of the first and second images and a comparison of least significant bits (LSBs) of the first and second images.

* * * * *